United States Patent
Choltco-Devlin et al.

(10) Patent No.: US 10,294,007 B2
(45) Date of Patent: May 21, 2019

(54) BEVERAGE CONTAINER WITH INSULATED COVER

(71) Applicant: Pacific Market International, LLC, Seattle, WA (US)

(72) Inventors: Evan Michael Choltco-Devlin, Ellensburg, WA (US); Ping The Phan, Shoreline, WA (US); Michael Carl Beckman, Ellensburg, WA (US)

(73) Assignee: PACIFIC MARKET INTERNATIONAL, LLC, Seattle, WA (US)

( * ) Notice: Subject to any disclaimer, the term of this patent is extended or adjusted under 35 U.S.C. 154(b) by 189 days.

(21) Appl. No.: 15/188,838

(22) Filed: Jun. 21, 2016

(65) Prior Publication Data

US 2017/0362012 A1  Dec. 21, 2017

(51) Int. Cl.
*A47J 41/00* (2006.01)
*B65D 39/00* (2006.01)
*B65D 41/58* (2006.01)
*B65D 81/38* (2006.01)

(52) U.S. Cl.
CPC ....... *B65D 81/3865* (2013.01); *A47J 41/0011* (2013.01); *A47J 41/0072* (2013.01); *B65D 39/0005* (2013.01); *B65D 41/58* (2013.01); *B65D 81/3841* (2013.01); *B65D 81/3869* (2013.01); *B65D 2251/0015* (2013.01); *B65D 2251/0075* (2013.01)

(58) Field of Classification Search
CPC ............... B65D 81/38; B65D 81/3865; B65D 81/3869; B65D 81/3872; B65D 81/3874; B65D 41/0435; B65D 41/62; B65D 81/3837; B65D 81/3841; A47J 41/0011; A47J 41/0072
See application file for complete search history.

(56) References Cited

U.S. PATENT DOCUMENTS 2,830,722 A * 4/1958 Darmstadt ........... A47J 41/0011
                                                              215/12.1
2,944,690 A * 7/1960 Darmstadt ........... A47J 41/0011
                                                              215/12.1

(Continued)

*Primary Examiner* — Jeffrey R Allen
*Assistant Examiner* — Jennifer Castriotta
(74) *Attorney, Agent, or Firm* — Davis Wright Tremaine LLP; George C. Rondeau, Jr.

(57) ABSTRACT

A beverage container assembly is provided comprising a beverage container body, a stopper member removably attachable to the beverage container to seal a beverage container aperture thereof, and a thermal insulation member removably attachable to an upper body portion of the beverage container body. The thermal insulation member has a sidewall extending downwardly from an upper portion and defining a downwardly opening cavity within which the upper body portion and the stopper are positioned. The sidewall and the upper portion of the thermal insulation member each include an inner wall and an outer wall spaced apart from the inner wall. An insulation chamber is disposed between the inner and outer walls. The thermal insulation member includes an engagement portion adapted to engage with a corresponding engagement portion of the upper body portion to removably attach the thermal insulation member thereto.

26 Claims, 5 Drawing Sheets

(56) References Cited

U.S. PATENT DOCUMENTS

| | | | | |
|---|---|---|---|---|
| 3,059,798 A | * | 10/1962 | Darmstadt | A47J 41/0011 215/12.1 |
| 3,341,045 A | * | 9/1967 | Sandler | A47J 41/00 215/12.2 |
| 3,627,162 A | * | 12/1971 | Dossin | A47J 41/0072 215/13.1 |
| 3,752,347 A | * | 8/1973 | Bell | A47J 41/0011 215/12.1 |
| 3,845,873 A | * | 11/1974 | Bridges | A47J 41/0055 215/12.2 |
| 8,152,367 B2 | * | 4/2012 | Roberts | G01K 1/14 220/523 |
| 2005/0178771 A1 | * | 8/2005 | Moran | A47J 41/0011 220/592.16 |
| 2015/0197390 A1 | * | 7/2015 | Kurabe | A47J 41/0077 220/592.27 |

* cited by examiner

BEVERAGE CONTAINER WITH INSULATED COVER

FIELD OF INVENTION

The present invention relates to insulated beverage containers, and more particularly to beverage containers having a removable stopper.

BACKGROUND

Figure 1:
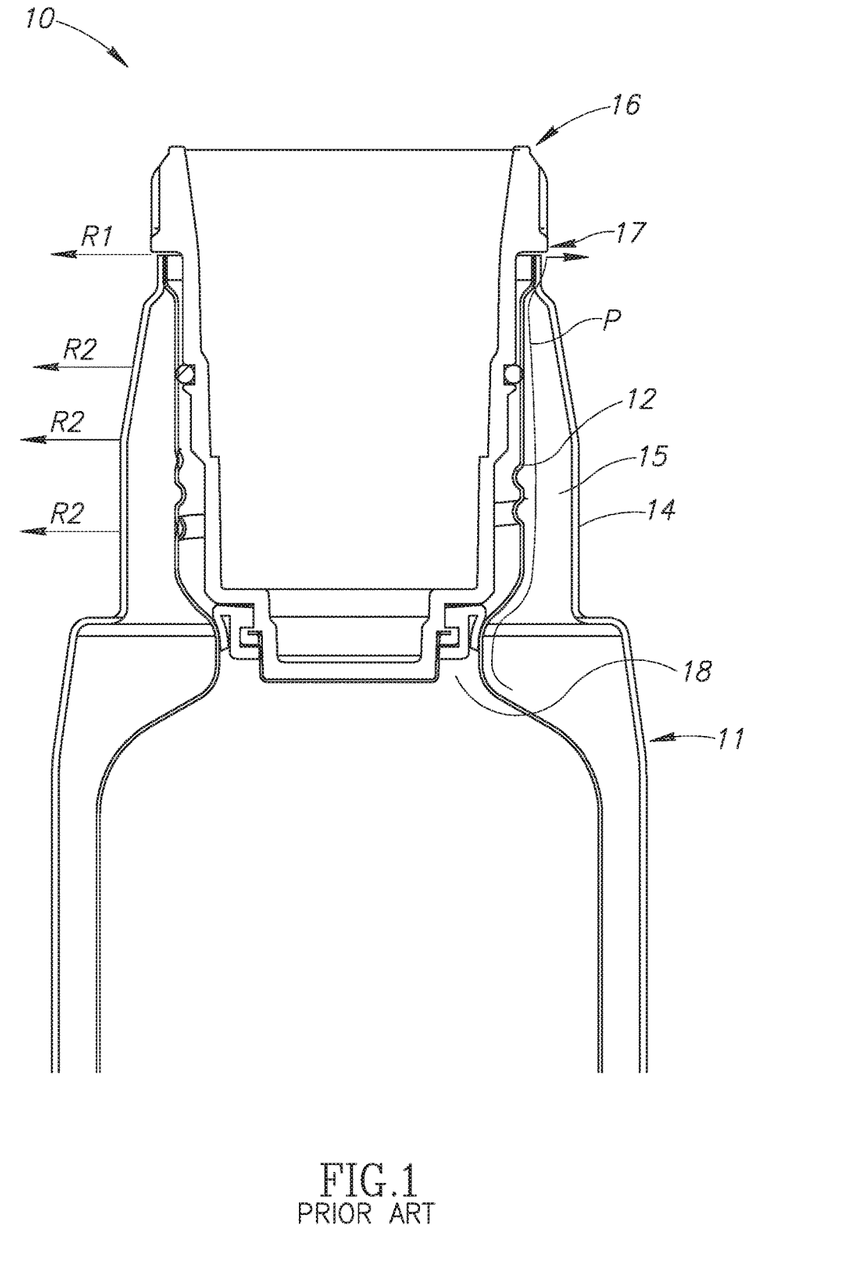
FIG. 1 illustrates a cross-sectional side view of a previously-implemented beverage container assembly.
Figure 2:
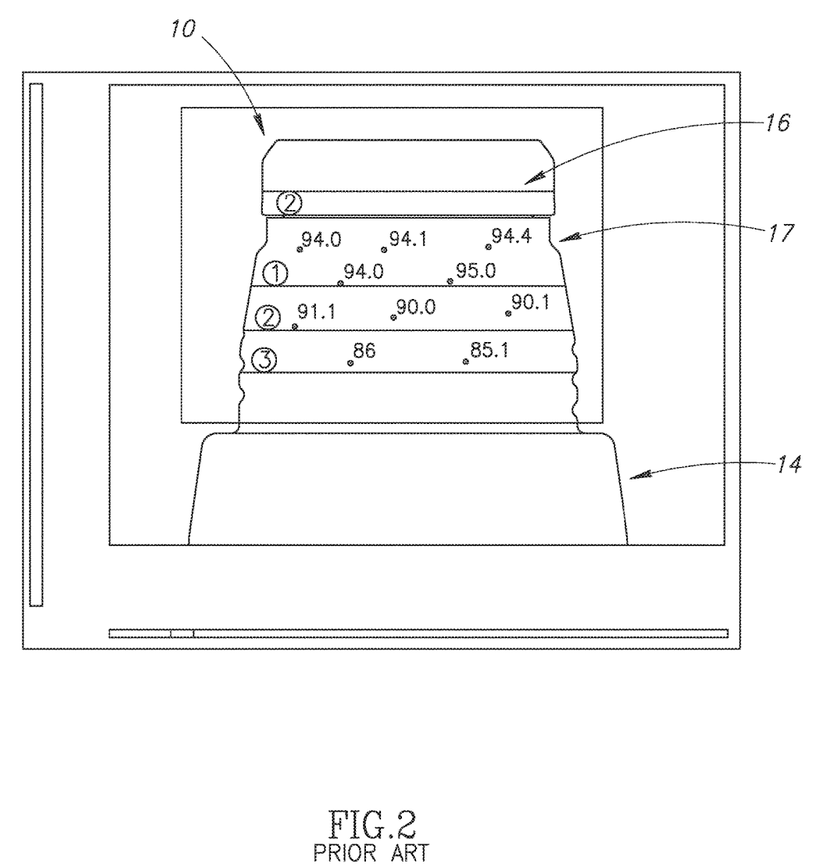
FIG. 2 illustrates a thermal image of the previously-implemented beverage container assembly of FIG. 1.

Some previously implemented beverage containers, such as beverage container assembly 10 shown in FIG. 1, include a container main body 11, an inner wall 12 and an outer wall 14 that may be separated by an insulating section 15 that helps to insulate against temperature change of the beverage container's contents. The beverage container assembly 10 may include a stopper 16 that may be removably attached to the container main body 11 to cover or seal a beverage aperture 18 through which liquid may flow. When the stopper 16 is positioned within the beverage aperture 18, a seam 17 is formed between the beverage container main body 11 and the stopper that is exposed to the external environment near the top of the beverage container main body where the inner wall 12 and the outer wall 14 meet. Heat from the beverage container contents may be conducted through the inner wall 12 along the path P and radiate outward at the seam 17 as heat radiation R1. Heat may be further conducted downwardly along the outer wall 14 and radiate outward as heat radiation R2 along the length of the outer wall. A representation of a thermal image of thermal radiation from a beverage container (such as described with respect to beverage container 10) is shown in FIG. 2, which identifies several thermal readings. The largest area of heat radiation is from the area labelled as Section 1, which is around the seam 17. Section 2 and Section 3 radiate less heat than Section 1. This thermal transfer between the beverage container contents and the outside environment occurs regardless of the thermal insulating capability of the stopper 16 covering the beverage aperture 18 of the beverage container 10.

DETAILED DESCRIPTION

Figure 3:
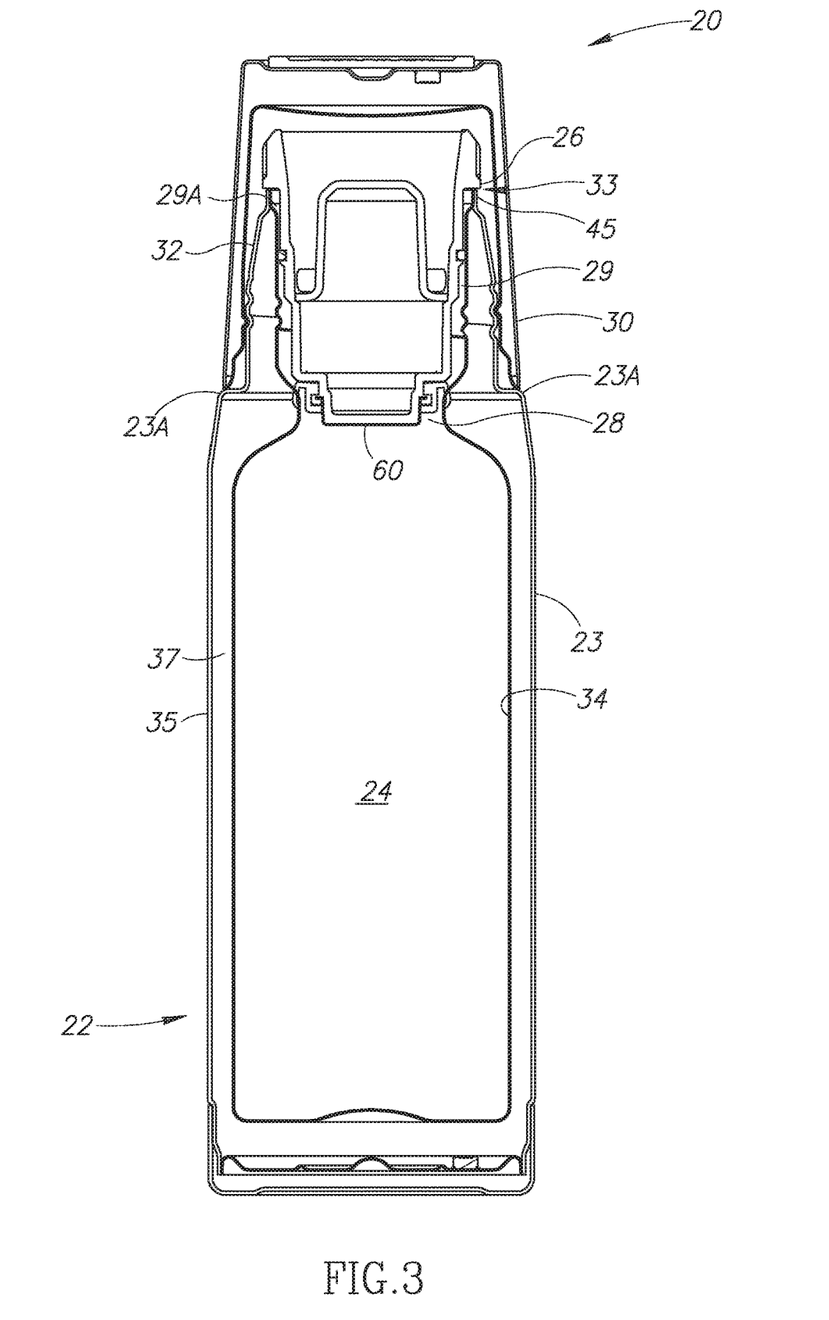
FIG. 3 illustrates a cross-sectional side view of a beverage container assembly according to a first embodiment.
Figure 4:
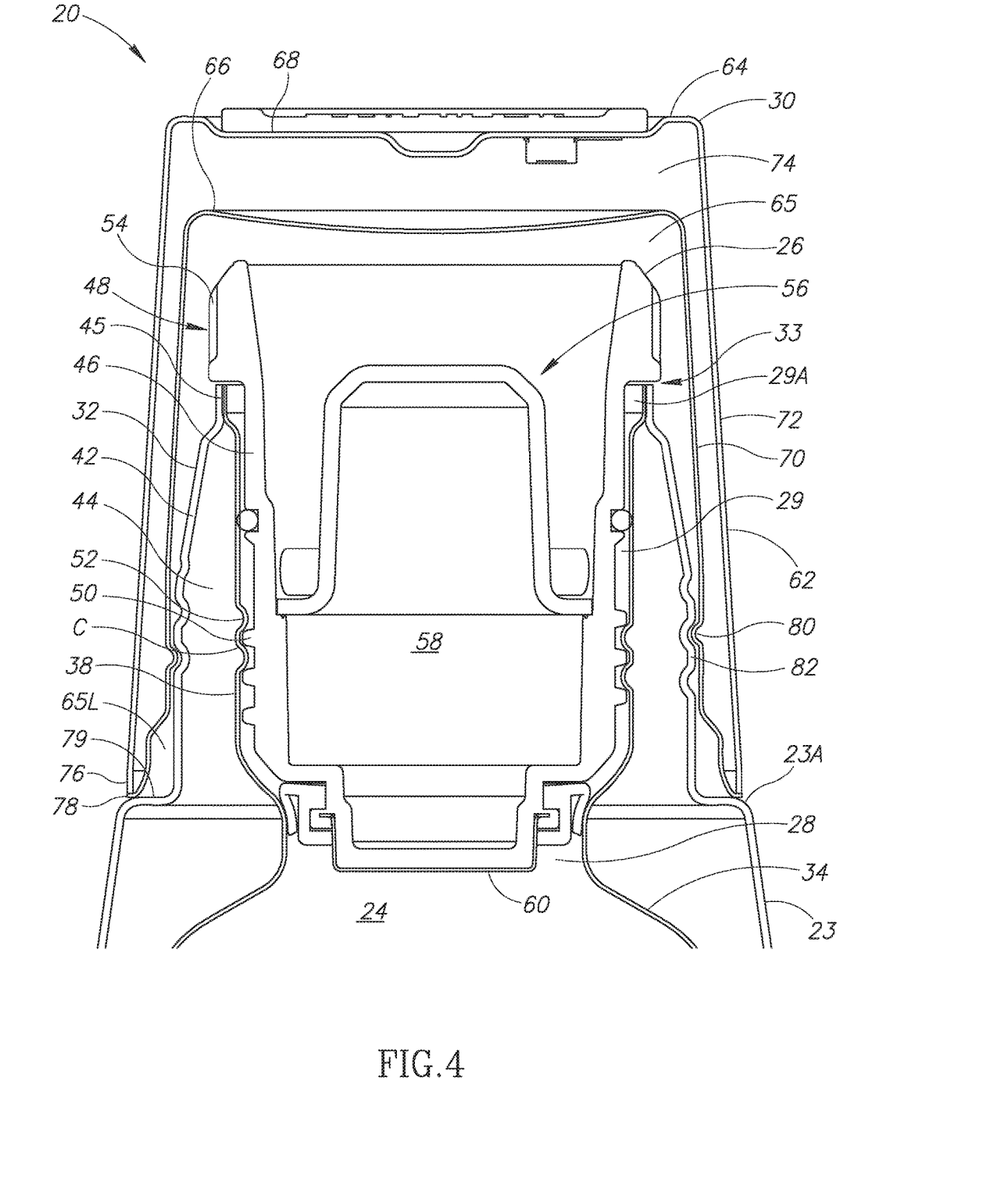
FIG. 4 illustrates an enlarged cross-sectional side view of the beverage container of FIG. 3.
Figure 5:
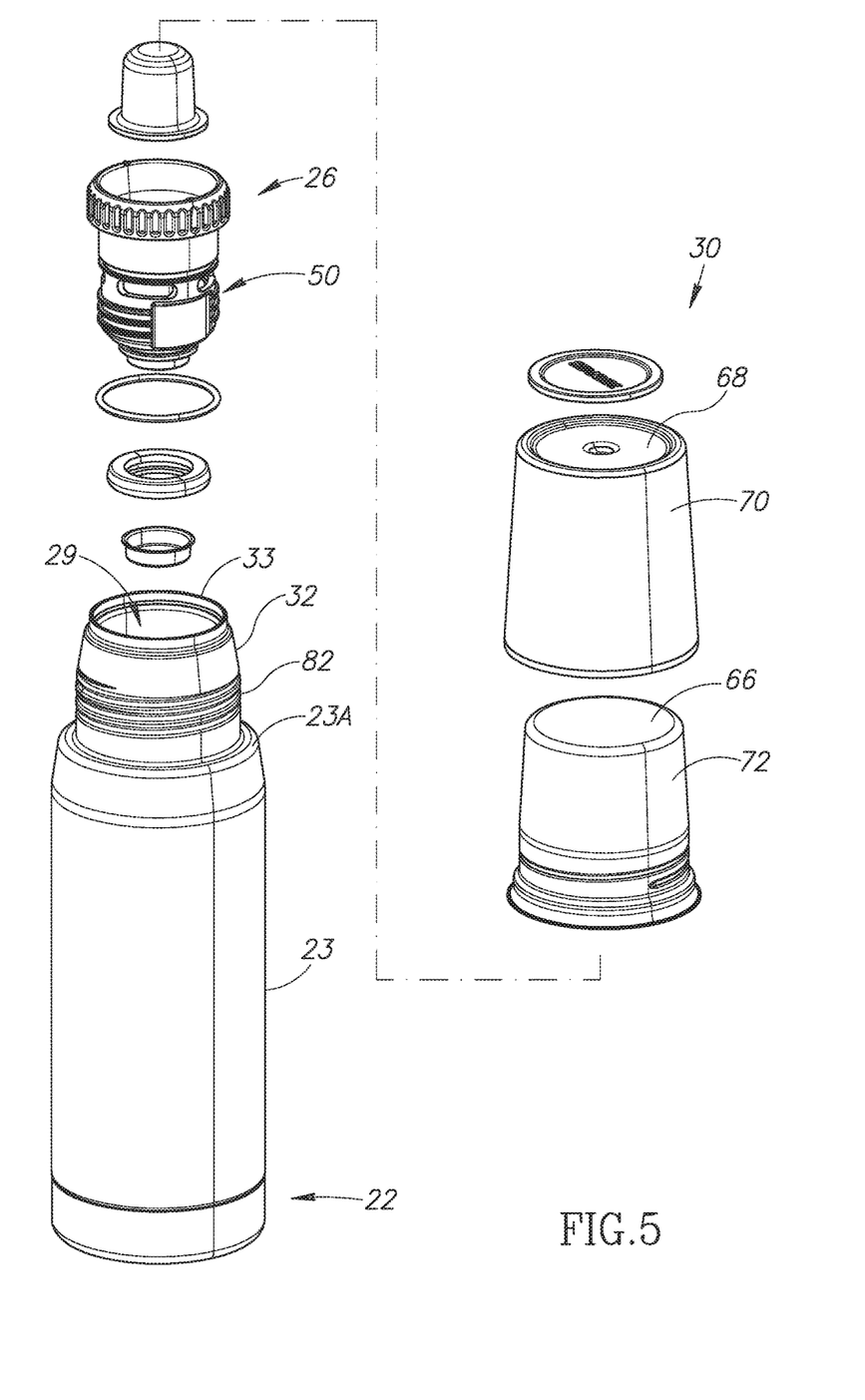
FIG. 5 illustrates an exploded view of the beverage container of FIG. 3.

A beverage container assembly 20 according to a first embodiment is shown in FIGS. 3, 4 and 5. The beverage container assembly 20 includes a beverage container body 22 having a lower body portion 23 containing a beverage cavity 24, a beverage container aperture 28 in fluid communication with the beverage cavity and an upper body portion 32 with an upper body portion passageway 29 extending between and in fluid communication with the beverage cavity and an upwardly opening end portion 29A of the upper body portion passageway. The beverage container assembly 20 further includes a stopper member 26 removably attached to the upper body portion 32 and positioned at least partially within the upper body portion passageway 29 for sealing the beverage container aperture 28, and a thermal insulation member 30 removably attached to the upper body portion 32. When the stopper member 26 is sealingly positioned in the upper body portion passageway 29 the stopper seals the beverage container aperture 28 and helps thermally insulate any fluid contained in the beverage cavity 24. The thermal insulation member 30 is removably attachable to the upper body portion 32 and serves as a cover for the beverage container body 22 and provides an insulated enclosure around the stopper member 26 and/or the beverage container aperture 28, and a seam 33 (described below), which helps to further insulate the fluid in the beverage cavity 24, as more fully described below. The thermal insulation member 30 may be a walled cover that, when the attached to the upper body portion 32, provides unexpectedly superior thermal insulation properties compared to a beverage container assembly having only a stopper member for covering the beverage aperture, such as the beverage container assembly 10 of FIG. 1.

The lower body portion 23 of the beverage container body 22 may have an inner sidewall 34 extending downwardly from an upper end portion 23A of the lower body portion and enclosing the beverage cavity 24. The inner sidewall 34 may taper inwardly toward the beverage aperture 28. The lower body portion 23 may include an outer sidewall 35 peripherally spaced apart from the inner sidewall 34 and defining an outer cylindrical portion of the lower body portion 23. A lower insulation portion 37 may be provided between the inner sidewall 34 and the outer sidewall 35. The lower insulation portion 37 may be a vacuum-sealed chamber or may include an insulation material, such as Styrofoam, polyurethane, polyethylene, fiberglass or other insulation material known in the art.

The upper body portion 32 extends upwardly from the upper end portion 23A of the lower body portion 23 and from the beverage container aperture 28. The upper body portion 32 may comprise a generally cylindrically shaped double-walled structure having an upper portion inner wall 38 defining the upper body portion passageway 29, and an upper portion outer wall 42 peripherally spaced apart from the upper portion inner wall 38. The upper body portion 32 may include an upper insulation portion 44 disposed between the upper portion inner wall 38 and the upper portion outer wall 42. The upper insulation portion 44 may be vacuum sealed portion or may include an insulation material described above. The upper portion inner wall 38 and the upper portion outer wall 42 are connected or join at a joint 45 at an upper end portion of the upper body portion 32, located at the upwardly opening end portion 29A of the upper body portion passageway 29.

The stopper member 26 may have a generally cylindrical shaped stopper sidewall 46 extending downwardly from a stopper upper portion 48. The stopper sidewall 46 is sized and shaped to tightly fit within the upper body portion passageway 29 and may abut the upper portion inner wall 38 to close the passageway and seal the beverage cavity 24. The stopper sidewall 46 may include first main body engagement portion 50 adapted to engage with a stopper member engagement portion 52 of the upper body portion 32 to removably secure the stopper member 26 within the upper body portion passageway 29. When the stopper member 26 is secured within the upper body portion passageway 29, the seam 33 is formed between the upper body portion 32 and the stopper upper portion 48. Heat from beverage in the beverage cavity 24 may be conducted upward through the inner sidewall 34, through the upper portion inner wall 38, and radiate outward at the seam 33. From the seam 33, heat may be conducted downward along and radiate from the upper portion outer wall 42.

In the present embodiment, the first main body engagement portion 50 of the stopper sidewall 46 and the stopper member engagement portion 52 of the upper body portion 32 are complementary threaded portions that are threadably engaged when the stopper member 26 is inserted into and rotated within the upper body portion passageway 29. In some embodiments, the first main body engagement portion 50 and the stopper member engagement portion 52 may removably secure the stopper member 26 within the upper body portion passageway 29 by other methods, such as a bayonet mount or friction fit, by way of non-limiting example. The stopper upper portion 48 may include a grip portion 54 for positioning and/or rotating the stopper member 26 within the upper body portion passageway 29. The stopper member 26 may further include a stopper insulation portion 56 provided in the space within the stopper sidewall 46 and having a stopper insulation chamber 58 for thermally insulating fluid in the beverage cavity 24 from an environment external to the beverage container assembly 20. The insulation chamber 58 may be disposed above a stopper member lower end 60 positioned at or in the beverage container aperture 28 when the stopper member 26 is secured within the upper body portion passageway 29.

The thermal insulation member 30 may have a cylindrical shape and include an insulation member sidewall portion 62 extending downwardly from an insulation member upper portion 64, as shown in FIG. 4. When the thermal insulation member 30 is removably secured to the upper body portion 32, the insulation member upper portion 64 is positioned above the beverage aperture 28 and the stopper member upper portion 48, and the insulation member sidewall portion 62 extends fully about the upper body portion 32, the joint 45 and the seam 33. The insulation member sidewall portion 62 may encompass the entire length of the upper body portion 32 down to the upper end portion 23A of the lower body portion 23. The upper portion 64 includes an upper portion inner wall 66 on a lower side thereof and an upper portion outer wall 68 above the upper portion inner wall 66. The insulation member sidewall portion 62 includes a sidewall inner wall 70 extending downwardly from the upper portion inner wall 66 and a sidewall outer wall 72 extending downwardly from the upper portion outer wall 68. An insulated cavity 65 may be formed between the thermal insulation member 30 and the stopper member 26 and/or the main body upper portion 32 when the thermal insulation member is attached to the beverage container main body 22. The upper portion inner wall 66, the upper portion outer wall 68, the sidewall inner wall 70 and the sidewall outer wall 72 may be comprised of a rigid, durable material, such as plastic or metal (e.g., aluminum).

The thermal insulation member 30 includes a thermal member insulation chamber 74 disposed between the upper portion inner wall 66, the upper portion outer wall 68, the sidewall inner wall 70 and the sidewall outer wall 72, for further insulating the stopper member 26 and the upper body portion 32. The thermal member insulation chamber 74 helps to retain heat that is conducted through the upper body portion 32 and/or passing through the joint 45, the seam 33 and the upper portion outer wall 42, and to prevent heat loss from the beverage container assembly 10. The thermal member insulation chamber 74 of the present embodiment is a vacuum sealed chamber having an insulating value higher than air or standard foam. The thermal conductivity of the thermal member insulation chamber 74 is 0.016 W/(m*K) or lower. Alternatively, the chamber 74 may contain a thermal insulation material with a low thermal conductivity, such as such as air, Styrofoam, polyurethane, polyethylene, fiberglass or other insulation material known in the art. The thermal member insulation chamber 74 contains heat and forms a more isolated system than the beverage container assembly 10 since it reduces the exchange of heat with the external environment.

The sidewall inner wall 70 and the sidewall outer wall 72 join at a sidewall end portion 76 at a lower end 78 of the thermal insulation member 30. When the thermal insulation member 30 is attached to the upper body portion 32, the end 78 of the sidewall end portion 76 may be adjacent to or abut an upper annular surface 79 of the upper end portion 23A of the lower body portion 33 to seal a cavity lower portion 65L of the cavity 65. The sidewall end portion 76 may include a soft, elastically deformable material on an exterior surface thereof that deforms when the end 78 is pressed against the upper end portion 23A of the lower body portion 23, helping to create an airtight seal. The end 78 may include a joint or seam at which the sidewall inner wall 70 and sidewall outer wall 72 are bonded together. Alternatively, the sidewall end portion 76 may comprise a continuous portion where the downwardly extending sidewall inner wall 70 bends or curves 180° at the end 78 to form the upwardly extending sidewall outer wall 72.

The insulation member sidewall portion 62 of the thermal insulation member 30 may include a second main body engagement portion 80 for attaching the thermal insulation member to the upper body portion 32. In the present embodiment, the second main body engagement portion 80 is a threaded portion provided on the sidewall inner wall 70. The second main body engagement portion 80 is adapted to engage with a complementary threaded thermal member engagement portion 82 on the upper portion outer wall 42 of the upper body portion 32. The threaded engagement between the second main body engagement portion 80 and the thermal member engagement portion 82 may create a barrier separating the cavity 65 and the lower cavity 65L. Other methods of attachment are contemplated, such as a bayonet mount or corresponding ferromagnetic elements provided in the thermal insulation member 30 and the upper body portion 32. In some embodiments, the thermal member engagement portion 82 may be provided on an upper surface of the lower body portion 23 of the beverage container body 22 at a location at or below the upper end portion 23A.

When engaged, the second main body engagement portion 80 and the thermal member engagement portion 82 comprise a connection area C between the upper body portion 32 and the thermal insulation member 30. The connection area C is spaced apart from the joint 45 at a distance such that a minimal amount of heat is conducted directly through the upper portion outer wall 42 to the sidewall inner wall 70 of the thermal insulation member 30. The thermal member engagement portion 82 may be positioned closer to the upper end portion 23A of the lower body portion 23 than the joint 45 or the seam 33 or the joint 45. The position of the connection area C minimizes the heat loss of a beverage within the beverage cavity 24 of the lower body portion 23 via heat conduction through the walls of the beverage container body 22. The insulation (e.g., vacuum sealed, or insulation material) of the thermal insulation member 30 minimizes heat loss of the contents of the upper body portion 32 by blocking significant convection and radiation that can occur around the joint 45, the seam 33 or the upper portion outer wall 42 compared with a beverage container having an exposed joint between the stopper and the upper body portion which receives the stopper, such as the beverage container 10 of FIG. 1.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Accordingly, the invention is not limited except as by the appended claims.

The invention claimed is:

1. A beverage container assembly comprising:
a beverage container body including a container lower portion having a beverage cavity, a container upper portion and a container aperture positioned between the container lower portion and the container upper portion, the container upper portion having a container upper portion passageway extending upwardly from the container aperture and terminating in an upwardly opening passageway end portion, the beverage cavity extending downwardly from the container aperture, the container upper portion including a stopper member engagement portion and a thermal insulation member engagement portion, the container having an inner sidewall portion and an outer sidewall portion spaced outward of the inner sidewall portion sealed together to define a fluid-tight body insulation chamber therebetween having a sealed vacuum therein;
a stopper member having a first container engagement portion removably engageable with the stopper member engagement portion to removably attach the stopper member to the container upper portion, the stopper member being sized to fit at least partially within the container upper portion passageway to close the container upper portion passageway and thereby seal the container aperture, the interface between the container upper portion and the stopper member defining a seam therebetween; and
a thermal insulation member having a second container engagement portion removably engageable with the thermal insulation member engagement portion to removably attach the thermal insulation member to the container upper portion, an upper portion, an insulating sidewall portion projecting downwardly from the upper portion, the upper portion and the sidewall portion covering at least a portion of the stopper member located adjacent to the passageway end portion, the passageway end portion and at least a portion of the container upper portion extending downwardly from the passageway end portion when the thermal insulation member is attached to the container upper portion, a lower end portion of the sidewall portion of the thermal insulation member abutting the outer sidewall portion of the container when the thermal insulation member is attached to the container upper portion to define an insulated cavity between the thermal insulation member and a portion of the stopper member extending upward above the passageway end portion of the container upper portion and an upper portion of the outer sidewall portion of the container extending upward above the lower end portion of the sidewall portion of the thermal insulation member, the insulated cavity containing heat from the beverage cavity conducted upward through the inner sidewall portion of the container, outward past the seam and downward through the outer sidewall portion of the container and then radiating outward from the outer sidewall portion of the container into the insulated cavity.

2. The beverage container assembly of claim 1, wherein the thermal insulation member engagement portion is located below the passageway end portion, and the second container engagement portion is located below the upper portion of the thermal insulation member.

3. The beverage container assembly of claim 2, wherein the sidewall portion of the thermal insulation member includes an inner sidewall portion and an outer sidewall portion spaced outward of the inner sidewall portion to define a body insulation chamber therebetween, the thermal insulation member engagement portion being located on the upper portion of the outer sidewall portion of the container and the second container engagement portion being located on the inner sidewall portion of the thermal insulation member.

4. The beverage container assembly of claim 3, wherein the container lower portion has an upper end portion, the thermal insulation member engagement portion being located closer to the upper end portion of the container lower portion than to the passageway end portion.

5. The beverage container assembly of claim 4, wherein a portion of the upper portion of the outer sidewall portion of the container extends below the thermal insulation member engagement portion to the upper end portion of the container lower portion.

6. The beverage container assembly of claim 1, wherein the container lower portion has an upper end portion, and the lower end portion of the sidewall portion of the thermal insulation member is spaced away from the upper portion of the thermal insulation member, and the sidewall lower end portion of the thermal insulation member is located below the second container engagement portion and adjacent to the upper end portion of the container lower portion.

7. The beverage container assembly of claim 6, wherein the lower end portion of the sidewall portion of the thermal insulation member abuts the outer sidewall portion of the container at the upper end portion of the container lower portion when the thermal insulation member is attached to the container upper portion.

8. The beverage container assembly of claim 1, wherein the upper portion of the thermal insulation member includes an upper portion inner wall and an upper portion outer wall upwardly spaced above the upper portion inner wall to define a first insulation chamber portion therebetween, and the sidewall portion of the thermal insulation member includes a sidewall inner wall and a sidewall outer wall peripherally spaced outward of the sidewall inner wall to define a second insulation chamber portion therebetween, the second insulation chamber extending downward from the upper portion of the thermal insulation member fully to a lower end of the lower end portion of the sidewall portion of the thermal insulation member.

9. The beverage container assembly of claim 8, wherein the first and second insulation chamber portions define a vacuum-sealed chamber.

10. The beverage container assembly of claim 8, wherein the first and second insulation chamber portions have an insulation material therein.

11. The beverage container assembly of claim 8, wherein the upper portion inner wall, the upper portion outer wall, the sidewall inner wall and the sidewall outer wall are comprised of a same material.

12. The beverage container assembly of claim 1, wherein the upper portion and the sidewall portion of the thermal insulation member define a downwardly opening cavity sized to receive at least a portion of the stopper member located adjacent to the passageway end portion, the passageway end portion and at least a portion of the container upper portion.

13. A thermal insulation member for removably attaching to a beverage container having a stopper, the beverage container having a container upper portion with a container upper portion passageway and terminating in an upwardly opening passageway upper end, the container having an inner sidewall portion and an outer sidewall portion spaced outward of the inner sidewall portion sealed together to define a fluid-tight body insulation chamber therebetween having a sealed vacuum therein, the stopper having a stopper upper end portion and a stopper lower end portion, the stopper being removably insertable into the container upper portion passageway through the passageway upper end to position the stopper lower end portion below the passageway upper end and to close the container upper portion passageway, the interface between the container upper portion and the stopper defining a seam therebetween, the thermal insulation member comprising:
a thermal insulation member removably attachable to the container upper portion, the thermal insulation member having an upper portion and a sidewall projecting downwardly from the upper portion and terminating at a lower end, the sidewall having an inner sidewall portion and an outer sidewall portion spaced outward of the inner sidewall portion to define a thermal insulation member insulation chamber therebetween, the thermal insulation member insulation chamber extending downward from the upper portion of the thermal insulation member fully to the lower end of the sidewall, the inner sidewall portion of the sidewall of the thermal insulation member defining a downwardly opening interior chamber sized to receive therein at least a portion of the container upper portion and the stopper upper end portion extending above the passageway upper end when the thermal insulation member is attached to the container upper portion, the lower end of the sidewall of the thermal insulation member abutting the outer sidewall portion of the container when the thermal insulation member is attached to the container upper portion to define an insulated cavity between the inner sidewall portion of the sidewall of the thermal insulation member and the stopper upper end portion extending above the passageway upper end and an upper portion of the outer sidewall portion of the container extending upward above the lower end of the sidewall of the thermal insulation member, the insulated cavity containing heat from the beverage cavity conducted upward through the inner sidewall portion of the container, outward past the seam and downward through the outer sidewall portion of the container and then radiating outward from the outer sidewall portion of the container into the insulated cavity.

14. The thermal insulation member of claim 13, wherein the insulated wall portion has a lower end portion extending to a position below the passageway upper end.

15. The thermal insulation member of claim 13, wherein the thermal insulation member is removably attachable to the container upper portion by the sidewall of the thermal insulation member being removably engageable with the container upper portion at a position below the passageway upper end.

16. The thermal insulation member of claim 13, wherein the sidewall of the thermal insulation member extends downwardly sufficient to position the entire container upper portion within the insulated cavity when the thermal insulation member is attached to the container upper portion.

17. The thermal insulation member of claim 16, wherein the thermal insulation member insulation chamber includes an insulating material therein.

18. A beverage container assembly comprising:
a beverage container body including a container lower portion having a beverage cavity, a container upper portion with a container upper portion passageway in fluid communication with the beverage cavity and terminating in an upwardly opening passageway upper end, the container having an inner sidewall portion and an outer sidewall portion spaced outward of the inner sidewall portion sealed together to define a fluid-tight body insulation chamber therebetween having a sealed vacuum therein;
a stopper having a stopper upper end portion and a stopper lower end portion, the stopper being removably insertable into the container upper portion passageway through the passageway upper end to position the stopper lower end portion below the passageway upper end and to close the container upper portion passageway, the stopper being removably engageable with the container upper portion, the interface between the container upper portion and the stopper defining a seam therebetween; and
a thermal insulation member removably attachable to the container upper portion, the thermal insulation member having an upper portion and a sidewall projecting downwardly from the upper portion and terminating at a lower end, the sidewall having an inner sidewall portion and an outer sidewall portion spaced outward of the inner sidewall portion to define a thermal insulation member insulation chamber therebetween, the thermal insulation member insulation chamber extending downward from the upper portion of the thermal insulation member fully to the lower end of the sidewall, the inner sidewall portion of the sidewall of the thermal insulation member defining a downwardly opening interior chamber sized to receive therein at least a portion of the container upper portion and the stopper upper end portion extending above the passageway upper end when the thermal insulation member is attached to the container upper portion, the lower end of the sidewall of the thermal insulation member abutting the outer sidewall portion of the container when the thermal insulation member is attached to the container upper portion to define an insulated cavity between the inner sidewall portion of the sidewall of the thermal insulation member and the stopper upper end portion extending above the passageway upper end and an upper portion of the outer sidewall portion of the container extending upward above the lower end of the sidewall of the thermal insulation member, the insulated cavity containing heat from the beverage cavity conducted upward through the inner sidewall portion of the container, outward past the seam and downward through the outer sidewall portion of the container and then radiating outward from the outer sidewall portion of the container into the insulated cavity.

19. The beverage container assembly of claim 18, wherein the lower end of the sidewall of the thermal insulation member abuts the outer sidewall portion of the container at a position below the passageway upper end.

20. The beverage container assembly of claim 18, wherein the thermal insulation member is removably attachable to the container upper portion by the sidewall of the thermal insulation member being removably engageable with the container upper portion at a position below the passageway upper end.

21. The beverage container assembly of claim 18, wherein the sidewall of the thermal insulation member extends downwardly sufficient to position the entire container upper portion within the insulated cavity when the thermal insulation member is attached to the container upper portion.

22. The beverage container assembly of claim 21, wherein the thermal insulation member insulation chamber includes an insulating material therein.

23. The beverage container assembly of claim 18, wherein the lower end of the sidewall of the thermal insulation member abuts the outer sidewall portion of the container at an upper end portion of the container lower portion.

24. The beverage container assembly of claim 18, wherein the outer sidewall of the container lower portion has a perimeter wall portion located at an upper end of the beverage cavity and the lower end of the sidewall of the thermal insulation member abuts the perimeter wall portion of the container lower portion.

25. A beverage container assembly comprising:
a beverage container body including a container lower portion having a beverage cavity, a container upper portion with a container upper portion passageway in fluid communication with the beverage cavity and terminating in an upwardly opening passageway upper end, the container having an inner sidewall portion and an outer sidewall portion spaced outward of the inner sidewall portion sealed together to define a fluid-tight body insulation chamber therebetween having a sealed vacuum therein;

a stopper having a stopper upper end portion and a stopper lower end portion, the stopper being removably insertable into the container upper portion passageway through the passageway upper end to position the stopper lower end portion below the passageway upper end and to close the container upper portion passageway, the stopper being removably engageable with the container upper portion, the interface between the container upper portion and the stopper defining a seam therebetween; and a thermal insulation member removably attachable to the container upper portion, the thermal insulation member having an upper portion and an insulating sidewall projecting downwardly from the upper portion and terminating at a lower end, the sidewall of the thermal insulation member defining a downwardly opening interior chamber sized to receive therein at least a portion of the container upper portion and the stopper upper end portion extending above the passageway upper end when the thermal insulation member is attached to the container upper portion, the lower end of the sidewall of the thermal insulation member abutting the outer sidewall portion of the container when the thermal insulation member is attached to the container upper portion to define an insulated cavity between the sidewall of the thermal insulation member and the stopper upper end portion extending above the passageway upper end and an upper portion of the outer sidewall portion of the container extending upward above the lower end of the sidewall of the thermal insulation member, the insulated cavity containing heat from the beverage cavity conducted past the seam and then radiating outward into the insulated cavity.

26. A beverage container assembly comprising:
a beverage container body including a container lower portion having a beverage cavity, a container upper portion with a container upper portion passageway in fluid communication with the beverage cavity and terminating in an upwardly opening passageway upper end, the container having an inner sidewall portion and an outer sidewall portion spaced outward of the inner sidewall portion sealed together to define a fluid-tight body insulation chamber therebetween having a sealed vacuum therein;

a stopper having a stopper upper end portion and a stopper lower end portion, the stopper being removably insertable into the container upper portion passageway through the passageway upper end to position the stopper lower end portion below the passageway upper end and to close the container upper portion passageway, the stopper being removably engageable with the container upper portion, the interface between the container upper portion and the stopper defining a seam therebetween; and a thermal insulation member removably attachable to the container upper portion, the thermal insulation member having an upper portion and a sidewall projecting downwardly from the upper portion and terminating at a lower end, the sidewall having an inner sidewall portion and an outer sidewall portion spaced outward of the inner sidewall portion to define a thermal insulation member insulation chamber therebetween, the thermal insulation member insulation chamber extending downward from the upper portion of the thermal insulation member fully to the lower end of the sidewall, the inner sidewall portion of the sidewall of the thermal insulation member defining a downwardly opening interior chamber sized to receive therein at least a portion of the container upper portion and the stopper upper end portion extending above the passageway upper end when the thermal insulation member is attached to the container upper portion, the lower end of the sidewall of the thermal insulation member abutting the outer sidewall portion of the container when the thermal insulation member is attached to the container upper portion to define an insulated cavity between the inner sidewall portion of the sidewall of the thermal insulation member and the stopper upper end portion extending above the passageway upper end and an upper portion of the outer sidewall portion of the container extending upward above the lower end of the sidewall of the thermal insulation member, the insulated cavity containing heat from the beverage cavity conducted past the seam and then radiating outward into the insulated cavity.

\* \* \* \* \*